US007251783B2

(12) United States Patent
Jackson et al.

(10) Patent No.: US 7,251,783 B2
(45) Date of Patent: Jul. 31, 2007

(54) LARGE AREA STORAGE DISPLAY

(75) Inventors: Warren Jackson, San Francisco, CA (US); Ping Mei, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 728 days.

(21) Appl. No.: 10/286,028

(22) Filed: Nov. 1, 2002

(65) Prior Publication Data

US 2004/0085343 A1 May 6, 2004

(51) Int. Cl.
G03B 15/00 (2006.01)
(52) U.S. Cl. .................................. 715/726; 715/805
(58) Field of Classification Search ................ 715/750, 715/755, 726, 771–773, 805, 741–743, 730–732, 715/799–800, 804, 864; 358/302, 1.2; 348/211.2; 386/68; 709/224, 203, 205
See application file for complete search history.

(56) References Cited

U.S. PATENT DOCUMENTS

| 5,923,307 | A | * | 7/1999 | Hogle, IV ....................... 345/4 |
| 5,963,911 | A | * | 10/1999 | Walker et al. .................. 705/7 |
| 6,053,740 | A | * | 4/2000 | Nakata et al. ........... 434/307 A |
| 6,288,719 | B1 | * | 9/2001 | Squilla et al. ............... 715/805 |
| 7,069,314 | B1 | * | 6/2006 | Aoki et al. .................. 709/224 |
| 2001/0039658 | A1 | * | 11/2001 | Walton .......................... 725/51 |
| 2002/0118949 | A1 | * | 8/2002 | Jones et al. .................... 386/68 |
| 2003/0161009 | A1 | * | 8/2003 | Yokoo et al. ................ 358/302 |
| 2004/0201709 | A1 | * | 10/2004 | McIntyre et al. ......... 348/211.2 |
| 2005/0069188 | A1 | * | 3/2005 | Rubbert et al. .............. 382/128 |

FOREIGN PATENT DOCUMENTS

FR 2783060 A1 * 3/2000

OTHER PUBLICATIONS

Microsoft Windows XP Professional (2001).*

* cited by examiner

Primary Examiner—Steven P. Sax

(57) ABSTRACT

A large area display workstation provides a liquid crystal display, configured to produce an image. The electrical components of the liquid crystal display are disposed on a substrate through a large area fabrication technique. The workstation has a first, high-resolution video display, and the large area display is a second, lower-resolution file identification display. The computer displays a user-selected file in a high-resolution format on the high-resolution video display for manipulation, and displays a plurality of file indicators in a low-resolution format on the large area display.

21 Claims, 3 Drawing Sheets

LARGE AREA STORAGE DISPLAY

BACKGROUND OF THE INVENTION

1. Field of the Invention

The present invention relates generally to digital display devices and related data manipulation systems. More particularly, the present invention relates to a large-size display device and method for manipulation of low-resolution images of digital documents, files, or windows.

2. Related Art

The typical office includes a desk and additional level workspace. This office structure permits a person to work with multiple paper information sources on multiple tasks. When a document is needed for a particular task, the person identifies the document based on its appearance and spatial location on the desk, and moves it to the center of attention (in front of the person) from some area spatially distributed in a peripheral region. The paper data source is sent back to the peripheral regions when the source is not needed but may be needed in the near future. The various sources of documents can be stored temporarily and in spatially relevant groupings. The physical presence of the document reminds a person of the document, its content, and the need for the document.

The universality of this office structure across company, country, history, and culture suggests that this is a natural and effective way to organize work. However, such an arrangement only works only for paper data sources, not electronic data sources. For manipulation of electronic data sources, office computer users typically work on one small high-resolution display device (i.e. computer monitor) in order to accomplish multiple tasks using the computer. Multiple windows, jobs and data sources are open simultaneously, and therefore are layered on top of each other. An elaborate system of icons and layering schemes are used to facilitate switching back and forth between sources. Unfortunately, there is not enough space on a small icon to display visually the content of a document for identification (i.e. all icons of a given type look nearly identical) or to arrange inactive data sources in spatially significant configurations (akin to the arrangement of physical documents on a desktop) while retaining enough space for other activities. A job set aside remains at the bottom of the pile or invisible in a folder/file system, even if there is an urgent time deadline associated with it. Important documents become invisible in most file systems and the important sources look the same as unimportant files.

SUMMARY OF THE INVENTION

It has been recognized that it would be advantageous to develop a system and method for arranging, storing, and manipulating electronic data files in a manner that is more intuitive and similar to the mode of use of paper documents.

It would also be advantageous to develop a system and method wherein electronic documents and files are visually and spatially arranged on an electronic display according to the arrangement preferences of a user.

It would also be advantageous to develop a system and method for displaying documents in a high-resolution format for use and manipulation, and in a low-resolution format for temporary storage.

In one embodiment, the invention advantageously provides a computer workstation, comprising a computer, a first, high-resolution video display, and a second, lower-resolution file identification display. The computer is configured to display user-selected files in a high-resolution format on the first video display for manipulation by a user, and to display a plurality of file indicators in a low-resolution format on the file identification video display.

In accordance with a more detailed aspect of the present invention, the plurality of file indicators on the file identification video display may include images having the appearance of a physical object, such as a file folder, a paper document, or a stack of paper documents, and may be approximately actual size, so as to mimic the appearance of a desktop with physical objects thereon, and allow identification of those items by a user.

In accordance with another more detailed aspect of the invention, the low-resolution file indicators may comprise computer icons or windows, that provide a portion of the content of the associated computer file, so as to allow identification by the user.

In accordance with yet another more detailed aspect thereof, the invention provides a digital display device, comprising a liquid crystal display, having a display surface and a plurality of pixels, configured to receive a signal from a digital device and to produce an image on the display surface, wherein the electrical components of the liquid crystal display are disposed on a substrate through a large area fabrication technique.

Additional features and advantages of the invention will be apparent from the detailed description which follows, taken in conjunction with the accompanying drawings, which together illustrate, by way of example, features of the invention.

DETAILED DESCRIPTION

Figure 1:
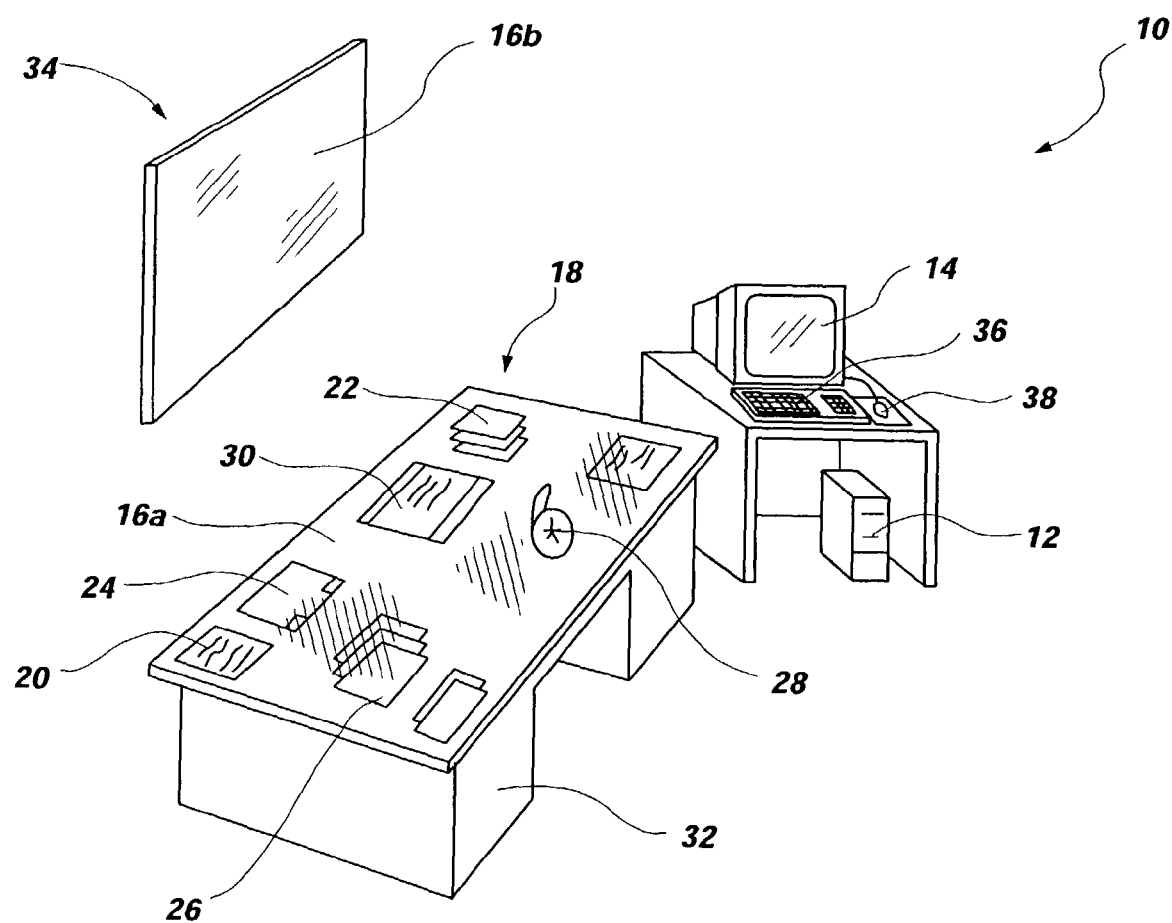
FIG. 1 is a perspective view of one embodiment of a workstation according to the present invention, having a large area display on a desktop, and on a wall.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Referring to FIG. 1, in one embodiment, the present invention provides a computer workstation 10, comprising a computer or microprocessor 12, a first, high-resolution video display 14, and a second, lower-resolution file identification video display 16, the two video displays being interconnected with the computer. The computer is configured to display a user-selected object in a high-resolution format on the first video display 14 for manipulation by a user, and to display one or more file indicators, indicated generally at 18, in a low-resolution format on the file identification video display 16. Stated differently, the first display device 14 has a substantially smaller size and substantially higher resolution than the second display device 16, and the computer is configured to allow selecting of at least one of the different images 18 having lower resolution on the second display device 16, for transfer and display on the first display device 14 with greater detail and higher resolution.

The file indicators 18 may take many forms. In one embodiment, the indicators comprise images having the appearance of a physical object, such as a paper document 20, a stack of documents 22, a file folder 24, or a stack of file folders 26. The indicator may also be a thumbnail or reduced resolution window of a slow sample video stream, a window on an active process, or a pictorial representation of a sound source. Advantageously, the file indicators may have substantially the same size and shape as the physical objects they represent, so as to more closely mimic the appearance and function of a physical desktop having physical objects thereon. With "actual size" images, the user can determine the nature of each item simply by looking at the image, without having to open a window, or perform some other common computer manipulation.

Alternatively, a file indicator 18 may take the form of a computer icon 28 or a computer window 30. These icons or windows are similar to those commonly used with typical computer operating systems and displays. However, given their large size, they can actually display a portion of the contents of their associated computer file, thereby giving the user instant information regarding their nature and content simply by looking, just as with paper documents and the like.

Advantageously, the large area display 16 supplements the more conventional small high-resolution display 14, and the invention can thus be viewed as a method for managing information contained in electronic data files, and for processing the data contained in the data files. The method includes the steps of first displaying identifying indicators of some of the electronic files on a low-resolution identification display. The user then prompts the computer system to move the display of one of the electronic files from the low-resolution identification display to the higher resolution working display by selecting one of the identifying indicators. The user may manipulate the data of the selected electronic file using the high-resolution display and the other computer controls, and then return the electronic file from the higher resolution display to the lower resolution display for future reference. Alternatively, of course, the user may close the electronic file if it is not likely to be needed again soon.

In another use, the large low-resolution display can be used to provide a view of an object at different scale of detail compared to that found in the high-resolution display. For example, low-resolution thumbnails of pages or pictures can be located on the low-resolution display while individual pages are displayed on the high-resolution display. New pages for the high-resolution display can be selected by using the low-resolution display. Another example would be viewing different scales of a map. One display provides the general context for the other display.

Two embodiments of a large area display are shown in FIG. 1. In one embodiment, the large area display 16a is disposed on top of a desk 32. In this embodiment, the large area display covers substantially the entire desktop, serving as both a digital display and as a work surface. It will be apparent that the large area display need not cover the entire desktop, leaving some area for other use. It will also be apparent that the display could be placed upon or incorporated into some other piece of furniture.

In another embodiment, a large area display 16b may be mounted onto a wall or other vertical structure as indicated at 34. Because of its large size, this wall-mounted embodiment may be placed some distance from the workstation 10, and accessed using the ordinary computer controls (the keyboard 36 and mouse or other pointer device 38).

The large area display 16 allows the electronic office work structure to more closely functionally resemble the traditional intuitive work arrangement of a desk and assorted groupings of physical documents and files. The large area display provides large images that can be dragged back and forth between the small high-resolution display 14 and the low-resolution display 16 as desired. The document images, icons, and/or windows can be arranged in spatially relevant locations on the large area display in the same way a worker might place physical documents and files in particular locations or piles on a desktop. This arrangement frees the high-resolution display 14 for active work, while placing the inactive work in a position for easy and rapid identification and access.

Compared to many digital display devices, the large area display 16 of the present invention is larger (2-3 ft. min. dimension), and may be much slower (as slow as 1 Hz refresh rate), and provide lower resolution (e.g. 0.5 mm pixel). However, this configuration is suitable for a display on which images are "stored" for relatively long-term periods. The software required to operate this display is well understood and is likely to be inexpensive (less than $1000), and the display is lightweight, and may also be flexible.

Most office computer software produces a virtual "desktop" in which multiple windows, jobs and data sources are open simultaneously, and therefore are layered on top of each other. An elaborate system of icons and layering schemes are used to facilitate switching back and forth between sources. Unfortunately, there is not enough space on a small icon to visually display the content of a file for identification (i.e. all icons of a given type look nearly identical) or to arrange inactive data sources in spatially significant configurations (akin to the arrangement of physical documents on a desktop) while retaining enough space for other activities. A job set aside remains at the bottom of the pile or invisible in a folder/file system, even if there is an urgent time deadline associated with it. Important documents become invisible in most file systems and the important sources look the same as unimportant files. The current computer arrangement is equivalent to performing office work on a 19-inch desk, or in one's lap. In the present invention however, jobs set aside are displayed on the large area display 12, which, though its resolution is lower, provides larger images, thereby allowing the user to identify the desired document or file just by looking, the same as with paper documents. Likewise, an image on the large area display could have the appearance of a stack of documents or files, through which the user could browse electronically, in order to find a desired document.

This display advantageously permits physical appearance identification of item content and spatial groupings of objects associated with physical data objects to be used with electronic data files. The need for time-consuming and potentially confusing layering of windows and icons is minimized. The use of the computer thus more closely follows the time-proven workflow, spatial grouping, and physical appearance identification of previous physical object manipulation.

The large area display 16 is produced by large area or web-based production. Current efforts for web and large area electronic displays attempt to simultaneously provide high resolution, low cost, and high speed. These goals are very difficult to achieve in one display with current and newly developed technology. Current high-resolution photolithography techniques (such as x-ray lithography) are routinely used to produce microprocessor chips with layer-to-layer accuracy in the range of a few angstroms. Unfortunately, the equipment required to apply these techniques on a physically large scale is limited, and would be prohibitively expensive.

For large area semiconductor fabrication, less costly methods are needed. "Large area" and "web-based" fabrication are terms used to describe production techniques for semiconductor or digital devices using roll-to-roll processing or other large area fabrication methods, comparable to high quality color printing techniques. The primary difference, of course, is that the substrate is not paper, and metal and semiconductor materials are deposited on the substrate, rather than ink. Such techniques are well known, and are currently used in solar cell panel production. The continuous throughput, large area, and ease of handling reduce the cost. The substrate costs are also lower because of the low temperature processing. Consequently, compared to conventional semiconductor fabrication processes, the cost of fabrication is greatly decreased using these methods.

However, the primary disadvantage of large area processing methods is that the resolution and layer-to-layer alignment accuracy is significantly less than required for typical c-Si electronic circuits. Large area fabrication methods provide substantially lower resolution than state-of-the-art semiconductor fabrication techniques. For example, the most accurate large area fabrication techniques presently only provide layer-to-layer alignment accuracy on the order of about 50 microns. This level of accuracy is sufficient to produce very high quality color pictures, but is not generally considered adequate resolution for photolithographic semiconductor fabrication. Such low resolution would necessitate the construction of larger features, resulting in slower operational speeds because of increased capacitance, lower current, and lower operation speeds of large area noncrystalline electronics.

The inventors have found that lower resolution fabrication can be accommodated by either making the transistor structure robust to alignment details, or by using a self-aligned fabrication procedure. Where low resolution (i.e. low pixel density and correspondingly large microprocessor component size), and low speed are acceptable, these methods are suitable. The invention thus provides a low cost, lower resolution, large area, and low weight digital display.

Figure 2A:
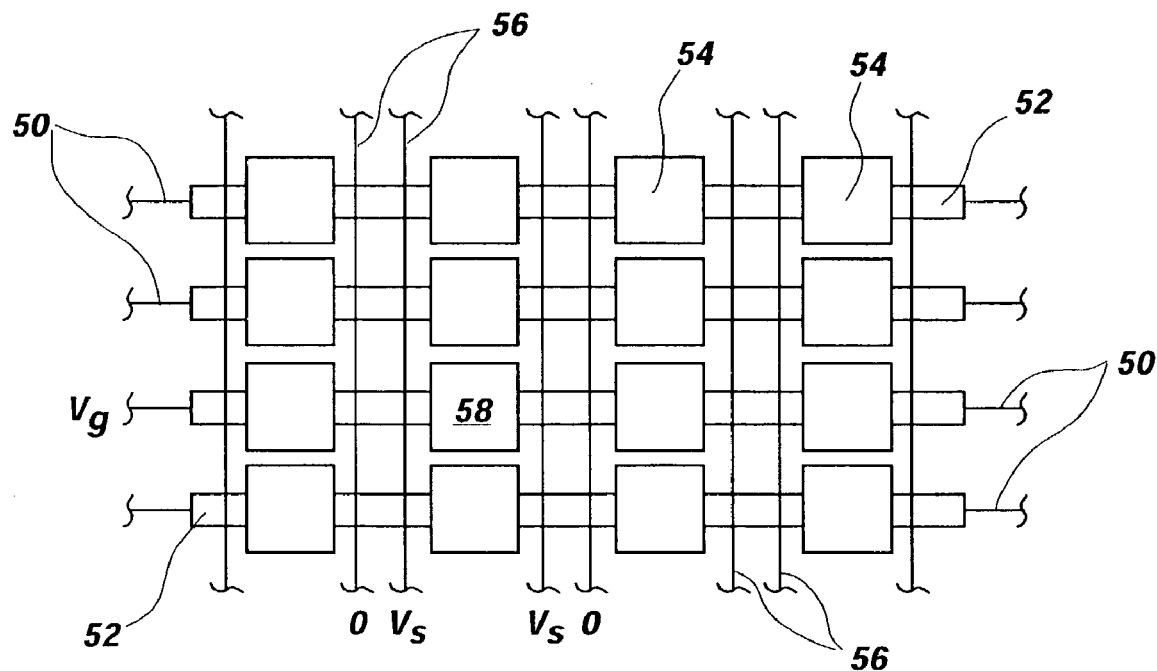
FIG. 2A is a close-up plan view of a portion of one embodiment of drive circuitry suitable for a large area display in accordance with the present invention.

Portions of two different display circuitry structures appropriate for fabrication of the large area display using lower resolution methods described above are shown in FIGS. 2A and 2B. Referring to FIG. 2A, one circuit structure that does not require critical alignment for displays consists of gate electrode strips or lines 50 disposed on an appropriate substrate material. Atop each gate electrode strip is a continuous "island" 52 of semiconducting silicon material, with metal source lines 56 and drain/pixel electrodes 54 disposed atop the silicon island.

To form the circuitry of FIG. 2A, the gate electrode strips 50, such as of chromium metal (Cr), are first deposited on a suitable substrate material, such as polyimide. The gate lines are then covered by a gate dielectric layer, such as silicon nitride (SiN), followed by an intrinsic layer ("i layer") of amorphous silicon (a-Si:H) or microcrystalline silicon (uc-Si:H). The i layer is covered with photoresist, which is exposed through the substrate (i.e. from below), and etched to yield the islands 52 of silicon on top of the gate dielectric. Then a layer of doped silicon (a-Si or uc-Si) is deposited atop the islands and patterned into the pixel/drain electrodes 54, and a top metal layer is deposited and patterned into the source lines 56. To complete the display, liquid crystal pixels (not shown) and a top transparent electrode (not shown) are added atop the pixel electrodes in the conventional manner.

The circuit of FIG. 2A operates in the following manner. To apply a voltage to a selected pixel electrode 58, the row is selected by applying a positive gate voltage $V_g$ to the respective gate line 50, and a source voltage $V_s$ to both source lines 56 bracketing the selected pixel. The gate voltage $V_g$ creates an accumulation of charge in the silicon i layer (i.e. the transistor channel) of the island 52, which causes the voltage of the selected pixel electrode to equalize with the surrounding source electrodes.

If the source electrodes 56 are at different voltages, current will flow through the island 52 (i.e through the i layer) between neighboring source electrodes in the selected row. This current flow occurs because the i layer is not patterned (i.e. is not discontinuous between pixels) in a given row as in a usual device. The unpatterned i-layer avoids the need for critical alignment because the pixel electrodes 54 do not have to be precisely aligned with the gate line 50. Instead, they must simply overlap the gate electrode and dielectric somewhere on the island 52. This provides a relatively large margin of error in layer-to-layer resolution.

Figure 2B:
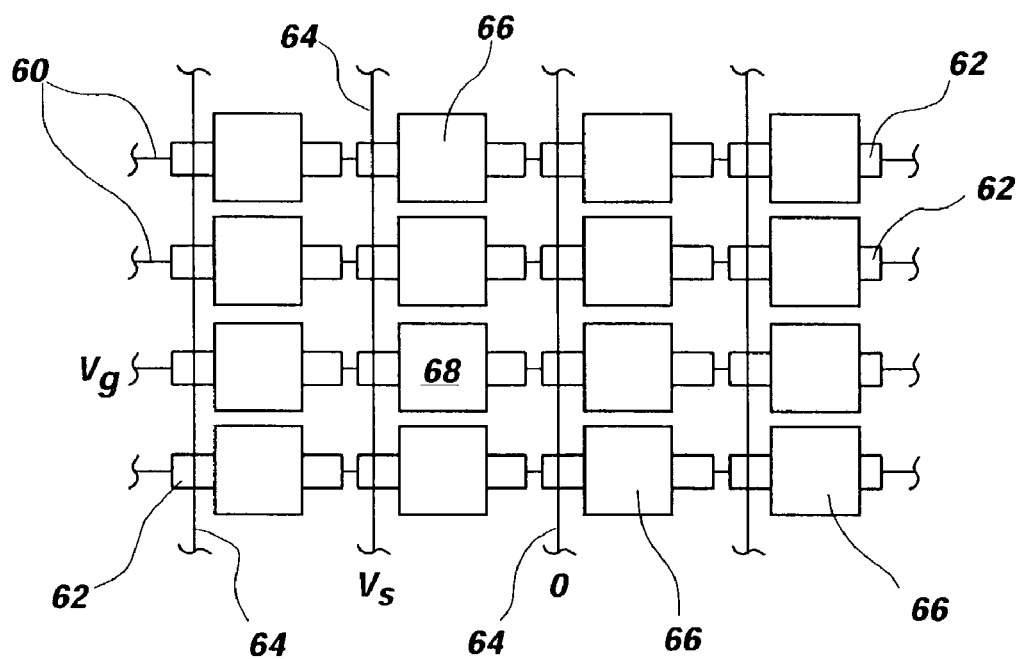
FIG. 2B is a close-up plan view of a portion of another embodiment of drive circuitry for a large area display in accordance with the present invention.

This particular structure is different from the usual display cell in a number of ways. First, there is overlap between the gate 50 and the source 56. This overlap is normally avoided, because it results in switching transients in the source/drain when the gate voltage is changed. However, for a slow storage display, as in the present invention, there is sufficient time to let these transients die away. Second is the provision of double source lines for each pixel. This structure permits greater redundancy against open lines, faster switching, and also prevents the potential of a neighboring pixel from transferring to the selected pixel through the unpatterned silicon channel (i.e. the island 52). However, these advantages come at the expense of lower resolution. Largely for this reason, prior work in this field has not considered such a structure A second embodiment that requires somewhat more critical alignment is shown in FIG. 2B. The structure of this embodiment is largely the same as that of FIG. 2A. The circuit includes gate lines 60 disposed on a substrate, with islands 62 of silicon material (forming the i layer) disposed thereatop, and source lines 64 and drain/pixel electrodes 66 disposed over the islands. To complete the display, liquid crystal pixels (not shown) and a top transparent electrode (not shown) would be added atop the pixel electrodes in a conventional manner. The primary difference between the embodiments of FIGS. 2A and 2B is that in the embodiment of FIG. 2B the island material is etched away to remove conduction paths (i.e. create gaps) between neighboring pixels. With this configuration, double source lines are not necessary.

The operation of the circuit of FIG. 2B is similar to that of FIG. 2A. To apply a voltage to a selected pixel electrode 68, the row is selected by applying a positive gate voltage $V_g$ to the respective gate line 60, and a source voltage $V_s$ to the source line 64 associated with the selected pixel. The gate voltage $V_g$ creates an accumulation of charge in the silicon i layer (i.e. the transistor channel) of the island 62, which causes the voltage of the selected pixel electrode to equalize with the source electrode. This allows the associated liquid crystal pixel (not shown) to be switched on and off in response to the changes in applied voltage.

The fabrication process for the embodiment of FIG. 2B is also similar to that of FIG. 2A. The metal gate lines 60 are first deposited and patterned on a substrate. Next successive layers of dielectric, then semiconductor, then (optional) dielectric material are deposited atop the gate lines. Typically, these layers could be SiN/a-Si:H/SiN or SiN/uc-Si/SiN. Photoresist is applied and the structure is illuminated (again from the back side) to expose the desired pattern, wherein the top dielectric and semiconductor material is removed between the gate lines and creating a gap between adjacent pixels, so as to form the islands 62. Finally, a source/drain metal is deposited and patterned into source lines 64, and drain/pixel electrodes 66 atop the islands. Prior to this last step, vias or access holes (not shown) are formed through the top dielectric to allow contact between the semiconductor and the source lines 64 and drain/pixel electrodes 66.

With the structure of FIG. 2B, as with that of FIG. 2A, the larger-than-required islands 62 avoid the need for critical alignment because the source lines 64 and drain/pixel electrodes 66 do not have to be precisely aligned with the gate line 60, but must simply overlap the gate electrode and dielectric somewhere on the island. The alignment required is pixel level accuracy, rather than source/drain to gate overlap accuracy. The critical alignment of the gate with the source and drain is relaxed because the gate will cross the pixel electrode and source line somewhere within the island. This overlap is undesirable for fast displays, because the gate signal feeds into the drain through the overlap capacitance. For slower displays, however, this transient has time to dissipate.

To complete the structure of the embodiments of both FIG. 2A and FIG. 2B, the gate lines 50, 60 and source lines 56, 64 go to the edge of the substrate where contact may be made using anisotropic conductors (i.e. zebra tape, not shown) or other means for connecting to c-Si driver electronics (not shown). The illustrations of FIGS. 2A and 2B and the described fabrication methods relate to a top gate device, but it will be apparent that the same structure could be possible for bottom gate devices as well.

An additional method for reducing the required alignment accuracy for transistor fabrication, and which is compatible with the structure of FIG. 2A, is to use a self-aligned process, of which a number have been developed. In this type of process the gate serves as a mask, defining the source-drain gap for a bottom gate device. Alternatively, the source-drain gap may serve as a mask defining the gate. These alternatives relax the critical alignment of the source-drain spacing with the gate, allowing the appropriate structure to be produced with lower resolution fabrication techniques.

A third means for reducing the fabrication complexity for both embodiments is to make the display a passive addressed display. Passive addressed displays are well known in the art, and do not require a gate for each pixel. Rather, the switching circuitry for control of the display is associated with the computer, not with the display. Consequently, the display only requires drive lines to each pixel, and electrodes for activating the liquid crystal pixels. The complexity of the switching is confined to the driving chips, and no critical alignment steps are required to fabricate the display. Passively addressed displays are relatively slow. However, a slower display is suitable for the large area display of the present invention because a slower response time is acceptable.

Lighting for the display can be accomplished by reflection or transmission in the conventional manner. Reflection is lower cost and lower power but the contrast is poor and color is difficult to achieve. Transmission can be accomplished by backlighting the liquid crystal with florescent, organic, or other light sources.

In a further embodiment of the invention, sensor pixels (not shown) may be incorporated into the liquid crystal display, in a manner well known in the art. These sensors could be optical or electrical. The latter could be touch screen technology using capacitance, for example. Incorporation of a grid of sensors into the display allows the user to move documents around the large area display or between the large area display and the high-resolution monitor without the inconvenience of a point device (i.e., a mouse). The sensors could be even lower resolution than the display for many applications.

Figure 3:
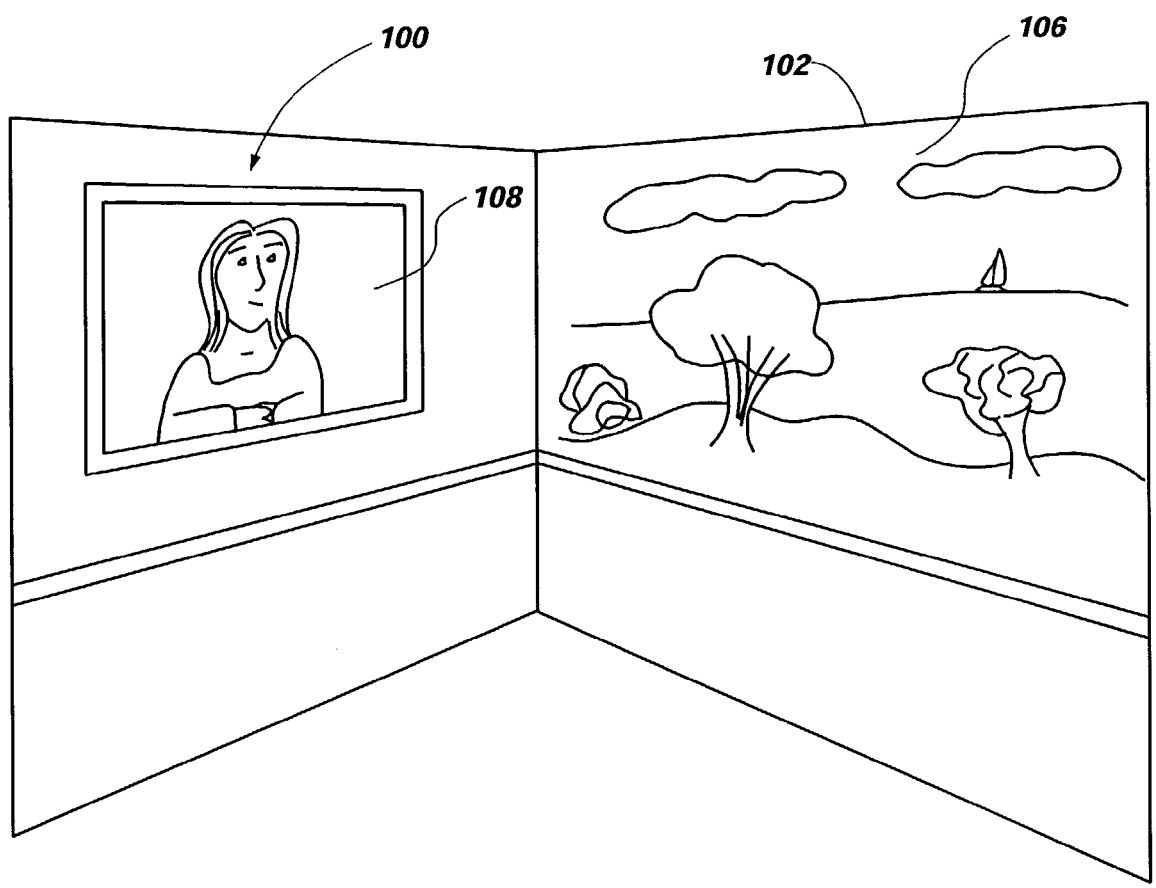
FIG. 3 is a perspective view of two additional embodiments of the large area display, including a large area decorative display, and electronic wallpaper.

As indicated above, this display can be easily attached to a wall, incorporated into a desktop, or other office furniture. Shown in FIG. 3 are two additional embodiments of the invention. The large area display can be configured as a decorative display 100, essentially an electronic framed picture that is changeable as desired. Alternatively, because the display can be fabricated on a flexible substrate, it can take the form of electronic wallpaper 102, which allows a user to select or change the appearance of a wall at will. One advantageous use for either of these embodiments is in windowless offices or cubicles, where a virtual "window" placed upon the wall, whether framed or not, can provide any desired image, including a live image of the outside world 106, or a favorite painting 108. This provides the office worker with the appearance of a pleasant view, and can also provide a psychologically beneficial sense of the passage of time as light and shadows change throughout a workday, similar to having an actual window. Many other uses are also possible.

Because the display is lower speed, coarser resolution, and fabricated using large area or web-based methods, it is much less expensive than existing large area displays. The lightweight and thin form factor enable the display to be easily incorporated into a wide variety of office configurations. This adaptability and low cost ensures higher production volumes and therefore lower cost than previous similar displays.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A workstation, comprising:
 a) a microprocessor;
 b) a first low pixel-density display device, interconnected to the microprocessor, configured to display a plurality of different images to a user, wherein the plurality of different images include file identifiers, and wherein the file identifiers are representations of files; and c) a second display device, interconnected to the microprocessor, configured to provide to the user a selected file identifier from among the plurality of different images, and allow the user to open the file represented by the selected file identifier and manipulate the data contained in the file represented by the selected file identifier, the second display device having a substantially smaller size and substantially higher resolution display capability than the first low pixel-density display device;

d) wherein the microprocessor is configured to allow selecting of at least one of the file identifiers from the first low pixel-density display device for transfer and display on the second display device, but does not allow a user to open the file represented by the file identifier on the first low pixel-density display device or manipulate the data contained in the file represented by the file identifier on the first low pixel-density display device.

2. A workstation in accordance with claim 1, wherein the first low pixel-density display device is incorporated into a piece of furniture, and wherein the piece of furniture is a desk having a desktop and the first low pixel-density display device is incorporated into the desktop and serves as both a digital display and as a work surface.

3. A workstation in accordance with claim 2, wherein the first low pixel-density display device is incorporated into substantially the entire desktop.

4. A workstation in accordance with claim 1, wherein each of the plurality of different images associated with the first low pixel-density display device have an appearance of a physical item selected from the group consisting of a file folder, a paper document, and a stack of paper documents.

5. A workstation in accordance with claim 4, wherein at least one image of the each of the plurality of different images has substantially the same size as the physical item the at least one image represents.

6. A workstation in accordance with claim 5, wherein at least one of the plurality of images is associated with more than one computer file.

7. A workstation in accordance with claim 1, wherein one of the plurality of different images associated with the first low pixel-density display device is selected from the group consisting of an icon, a window, and a pictorial representation of a sound source, and wherein the image represents a computer file, and visually displays a portion of the content of the computer file.

8. A computer workstation, comprising:

a) a computer;

b) a first, high-resolution video display, interconnected with the computer; and c) a second, lower-resolution file identification video display, interconnected with the computer, wherein the second lower-resolution file identification video display has a larger size and lower pixel density than the first higher-resolution video display.

d) wherein the computer is configured to display a user-selected file in a high-resolution format on the first video display for manipulation by the user, and to display a plurality of file indicators in a low-resolution format on the file identification video display, wherein the plurality of file indicators are representations of files, the second display device being configured such that the files represented by the file indicators cannot be opened and the data contained in the files cannot be manipulated from within the file identification video display, but the files are transferable from the second display device to the first, high-resolution video display to be manipulated by the user.

9. A computer workstation in accordance with claim 8, wherein at least one of the plurality of file indicators comprise images having an appearance selected from the group consisting of a physical object, a file folder, a paper document, a stack of paper documents, a computer icon, a thumbnail image, a window, a sample window of a video stream, a window on an active process, and a pictorial representation of a sound source.

10. A computer workstation in accordance with claim 9, wherein a file indicator has the appearance of a physical object and has substantially the same size as the physical object.

11. A computer workstation in accordance with claim 9, wherein the file indicator displays a pardon of the content of an associated computer file, at least some portion of the displayed content being legible when viewing the file indicator on the second lower-resolution file identification display.

12. A method for managing information contained in a plurality of electronic data files and for processing data contained in the electronic data files, comprising the steps of:

a) displaying identifying indicators representing at least some of the plurality of electronic data files on a low resolution identification display, wherein the identifying indicators display a portion of content of the electronic data files that the identifying indicators represent to allow a user to discern the content and determine the nature of the electronic data files resented by the identifying indicators without opening the identifying indicators to access the full content of the electronic data files and, wherein the electronic data files cannot be opened and to data contained in the electronic data file cannot be manipulated on the low resolution identification display;

b) prompting a microprocessor system to move the display of one of the multiple electronic data files from the low resolution identification display to a different, higher resolution working display by a user selecting one of the identifying indicators;

c) manipulating the data of the selected electronic data file using the high resolution display; and d) returning the electronic data file from the higher resolution display to the lower resolution display for future reference.

13. A method in accordance with claim 12, wherein the identifying indicators comprise an image having an appearance of a physical item selected from the group consisting of a paper file folder, a paper document, and a stack of paper documents.

14. A method in accordance with claim 13, wherein the identifying indicators have substantially the same size as the physical item.

15. A method in accordance with claim 13, wherein the identifying indicators are selected from the group consisting of icons and windows, and display the type and content of the respective electronic file.

16. A computer operating system for managing information contained in a plurality of electronic data files, comprising:

a) means for displaying identifying indicators representing at least some of the plurality of electronic data files in a spatially relevant arrangement on a low-resolution identification display, wherein the identifying indicators display a portion of content of the electronic data files that the identifying indicators represent to allow a user to discern the content and determine the nature of the electronic data files represented by the identifying indicators without opening the identifying indicators to access the full content of the electronic data files, and wherein the electronic data files cannot be opened and the data contained in the electronic data files cannot be manipulated on the low resolution identification display;

b) means for moving a display of at least one of the multiple electronic data files from the low resolution identification display to a different higher resolution working display by selecting one of the identifying indicators;

c) means for manipulating the data of the selected electronic data file while viewing the data on the high resolution display; and d) means for returning the electronic data file from the higher resolution display to the lower resolution display for future reference.

17. The workstation of claim 8, wherein the second, lower-resolution file identification video display is incorporated into a piece of furniture, and wherein the piece of furniture is a desk having a desktop and the second, lower-resolution file identification video display is incorporated into the desktop and saves as both a digital display and us a work surface.

18. The computer workstation of claim 12, wherein the low resolution identification display is incorporated into a piece of furniture, and wherein the piece of furniture is a desk having a desktop and the low resolution identification display is incorporated into the desktop and serves as both a digital display and as a work surface.

19. The computer operating system of claim 16, wherein the low-resolution identification display is incorporated into a piece of furniture, and wherein the piece of furniture is a desk having a desktop and the low-resolution identification display is incorporated into the desktop and serves as both a digital display and as a work surface.

20. The workstation of claim 1, wherein the file identifiers display a portion of the content of the file that the file identifier represents to allow a user to discern the content and determine the nature of the file represented by the file identifier without opening the file identifier to access the full content of the file.

21. The computer workstation of claim 8, wherein the file indicators display a portion of the content of the file that each file indicator represents to allow a user to discern the content and determine the nature of the file represented by the file indicator without opening the file indicator to access the full content of the file.

* * * * *